United States Patent [19]

Tsuzuki et al.

[11] 4,281,333

[45] Jul. 28, 1981

[54] INK-ON-DEMAND TYPE INK-JET PRINTER WITH COORDINATED VARIABLE SIZE DROPS WITH VARIABLE CHARGES

[75] Inventors: Mitsuo Tsuzuki; Michihisa Suga, both of Tokyo, Japan

[73] Assignee: Nippon Electric Co., Ltd., Tokyo, Japan

[21] Appl. No.: 120,579

[22] Filed: Feb. 11, 1980

[30] Foreign Application Priority Data

| | | | |
|---|---|---|---|
| Feb. 14, 1979 | [JP] | Japan | 54-16652 |
| Feb. 14, 1979 | [JP] | Japan | 54-16653 |
| Feb. 22, 1979 | [JP] | Japan | 54-20425 |
| Mar. 22, 1979 | [JP] | Japan | 54-33746 |
| Apr. 11, 1979 | [JP] | Japan | 54-44020 |
| Apr. 12, 1979 | [JP] | Japan | 54-44651 |
| May 4, 1979 | [JP] | Japan | 54-55023 |
| May 4, 1979 | [JP] | Japan | 54-55024 |
| May 4, 1979 | [JP] | Japan | 54-55025 |

[51] Int. Cl.$^3$ .......... G01D 15/18

[52] U.S. Cl. .......... 346/140 R; 346/75

[58] Field of Search .......... 346/75, 140 PD

[56] References Cited

U.S. PATENT DOCUMENTS

| | | | |
|---|---|---|---|
| 3,828,354 | 8/1974 | Hilton | 346/75 X |
| 3,871,004 | 3/1975 | Rittberg | 346/140 PD X |
| 3,911,448 | 10/1975 | Ohno et al. | 346/140 PD |

OTHER PUBLICATIONS

Chen, W. H. et al., Ink Jet Emitter, IBM Technical Disclosure Bulletin, vol. 14, No. 9, Feb. 1972, p. 2797.

Kamphoefner, F. J., Ink Jet Printing, IEEE Transactions on Electron Devices, vol. ED-19, No. 4, Apr. 1972, pp. 584-593.

*Primary Examiner*—George H. Miller, Jr.

*Attorney, Agent, or Firm*—Laff, Whitesel & Rockman

[57] ABSTRACT

An ink-jet printer uses droplets of conductive ink to print on a recording medium. The ink is in a chamber having a nozzle and a piezoelectric member attached to one wall of the chamber. The droplets are driven out of the nozzle in response to a driving pulse which is applied to the piezoelectric member. The size of the droplets is determined by the energy content of the driving pulse. The charges formed upon the droplets leaving the nozzle are generated responsive to the driving pulse and have a level which depends upon the driving pulse.

1 Claim, 26 Drawing Figures

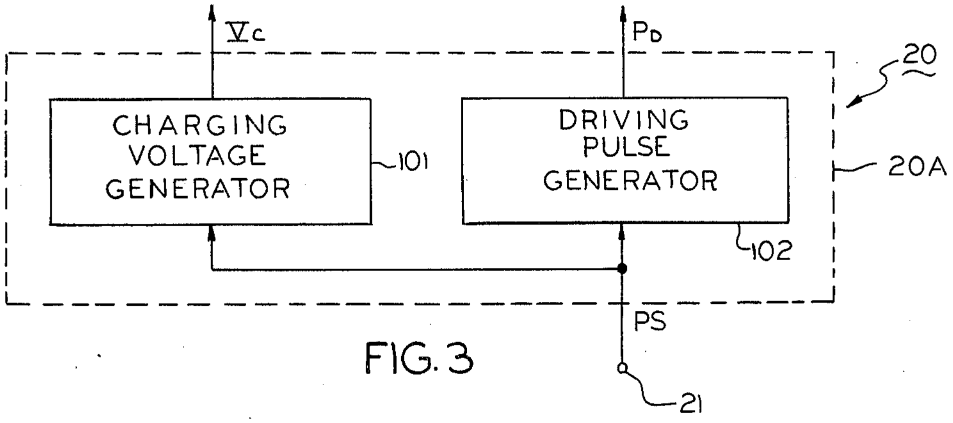
FIG. 3
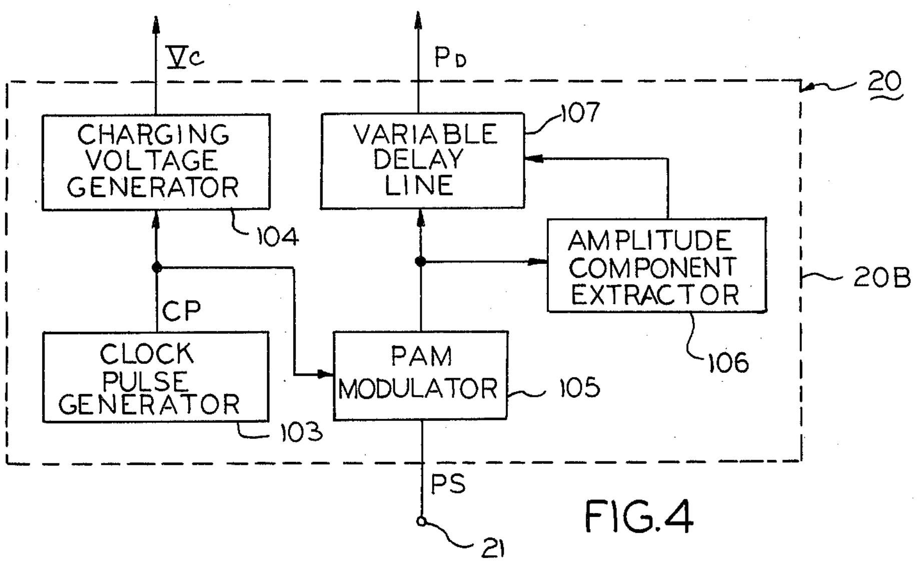
FIG. 4
FIG. 5A
FIG. 5B
FIG. 5C
FIG. 5D
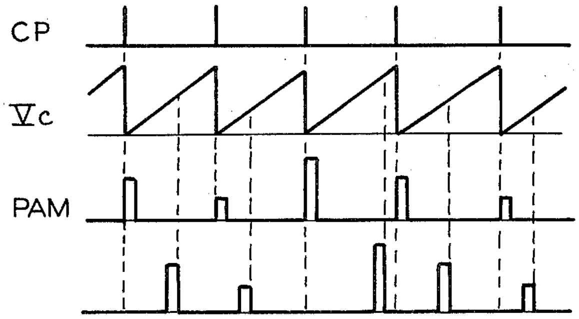
FIG. 6A
FIG. 6B
FIG. 6C
FIG. 6D
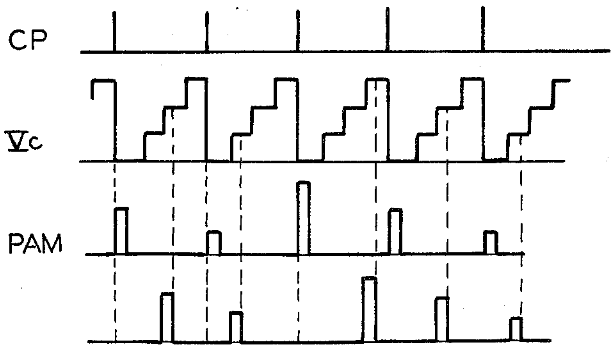

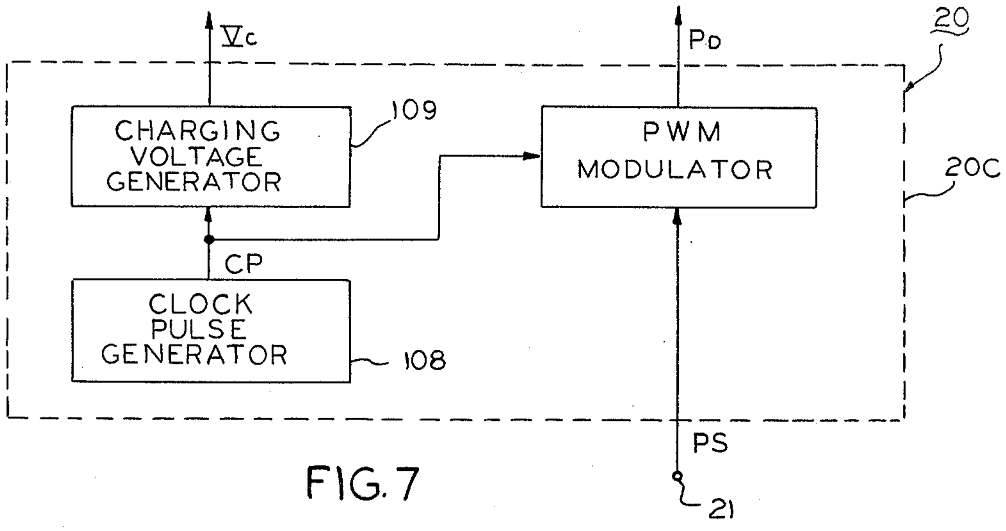
FIG. 7
FIG. 8A
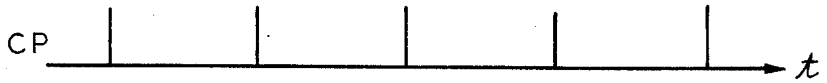
FIG. 8B
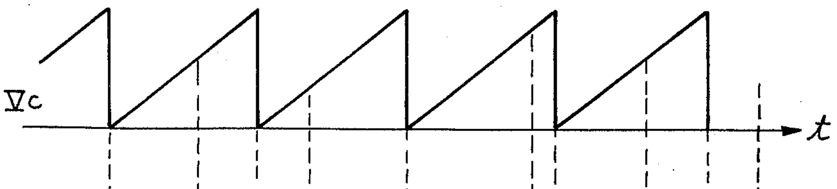
FIG. 8C
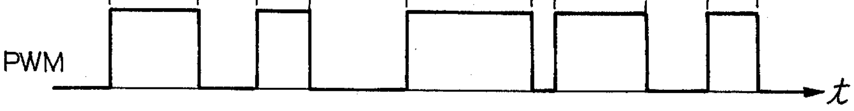
FIG. 9A
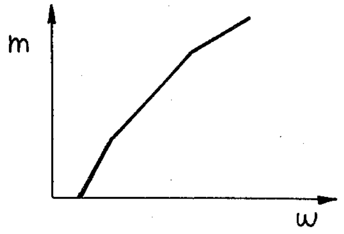
FIG. 9B
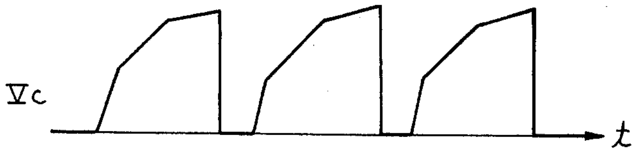

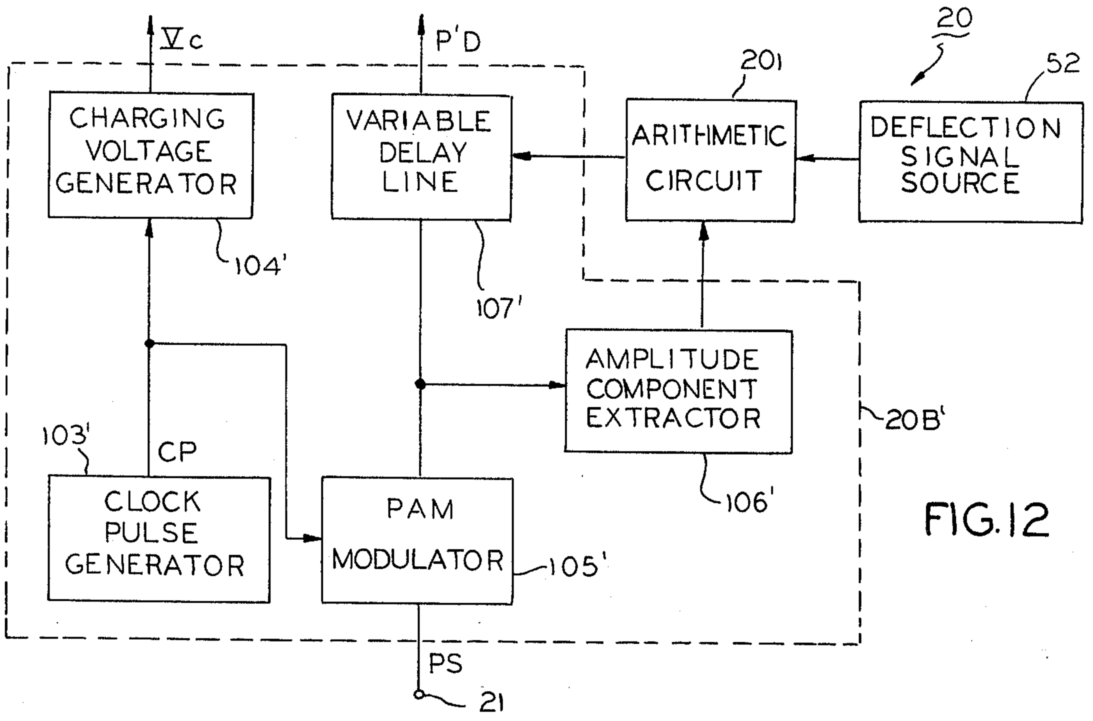
FIG. 12
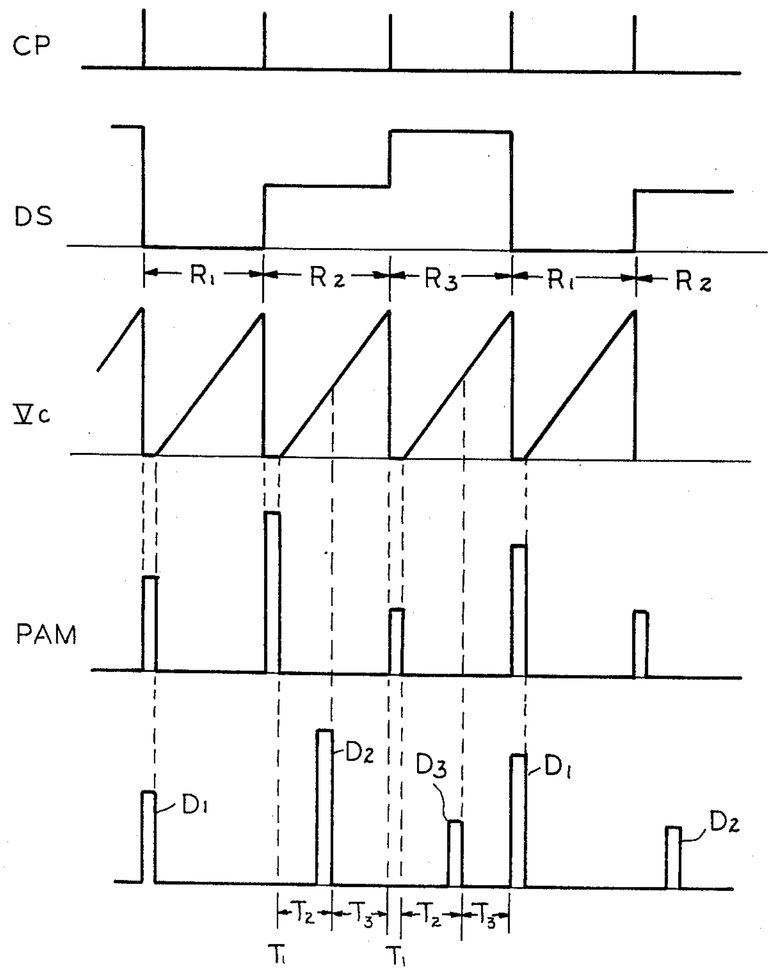
FIG. 13A
FIG. 13B
FIG. 13C
FIG. 13D
FIG. 13E

INK-ON-DEMAND TYPE INK-JET PRINTER WITH COORDINATED VARIABLE SIZE DROPS WITH VARIABLE CHARGES

This invention relates to an ink-on-demand type ink-jet printer in which ink droplets are squirted out each time a driving pulse is applied to a piezoelectric member attached to one wall of an ink chamber.

Various types of ink-jet printers have been proposed as described in an article "Ink Jet Printing" by Fred J. Kamphoefner published in the IEEE TRANSACTIONS ON ELECTRON DEVICES, VOL. ED-19, No. 4, APRIL 1972, pp. 584–593. The ink-jet printer of ink-on-demand type is described in detail, for example, in the U.S. Pat. No. 3,946,398 entitled "METHOD AND APPARATUS FOR RECORDING WITH WRITING FLUIDS AND DROP PROJECTION MEANS THEREFOR" issued to E. L. Kyser et al. and the U.S. Pat. No. 4,106,032 entitled "APPARATUS FOR APPLYING LIQUID DROPLETS TO A SURFACE BY USING A HIGH SPEED LAMINAR AIR FLOW TO ACCELERATE THE SAME" issued to M. MIURA et al. Major advantages of the ink-jet printer of ink-on-demand type are in that it is extremely simple in construction, all the droplets squirted out of the ink chamber are projected to a printing surface without withdrawal of the droplets, and that the droplet size may be varied by controlling the energy content of the driving pulse applied to the piezoelectric member thereby to make it possible to record a half tone.

In the conventional ink-on-demand type ink-jet printer, however, an electrostatic deflection method can not be applied for deflecting the ink droplets, because the droplets are different from each other in size. If the deflection field is applied to the droplets different from each other in size (weight), the resulting deflection is varied in response to the droplet size (weight).

Furthermore, the velocity of the droplets in the ink-jet printer of ink-on-demand type is lower than that in other types. The droplets differing from each other in size cannot be uniformly accelerated. The lower velocity of the droplets directly affects the stability of the printing.

It is, therefore, an object of this invention to provide an improved ink-jet printer of ink-on-demand type in which an electrostatic deflection can be applied for deflecting the ink droplets.

It is another object of this invention to provide an improved ink-jet printer of ink-on-demand type capable of contributing to reproduction of finer letters and patterns.

According to this invention, there is provided an ink-jet printer for recording with droplets of conductive ink on a recording medium, comprising:

an ink chamber filled with said conductive ink, said chamber having a nozzle and a piezoelectric member attached to one wall of said chamber, said chamber squirting said droplets out of said nozzle in response to a driving pulse applied to said piezoelectric member, the size of said droplets being responsive to the energy content of of said driving pulse;

means for charging said droplets squirted out of said nozzle in response to a charging voltage; and means for generating said driving pulse and said charging voltage, said charging voltage being responsive to said energy content of said driving pulse. dr Other features and advantages of this invention will be apparent from the following description of preferred embodiments of this invention taken in conjunction with the accompanying drawings, wherein:

FIGS. 3 and 4 are block diagrams of first and second examples of the driving pulse and charging voltage generator used in the first embodiment shown in FIG. 1;

FIGS. 5A through 5D and 6A through 6D are waveform diagrams of signals appearing at various parts of the second example shown in FIG. 4;

FIG. 7 is a block diagram of a third example of the generator 20 used in the first embodiment shown in FIG. 1;

FIGS. 8A, 8B, 8C, 9A and 9B are waveform diagrams of signals appearing at various parts of the third example shown in FIG. 7;

FIG. 12 is a block diagram of a second example of the generator 20′ used in the second embodiment shown in FIG. 10; and FIGS. 13A through 13E are waveform diagrams of signals appearing at various parts of the second example of the generator 20′ shown in FIG. 12.

Figure 1:
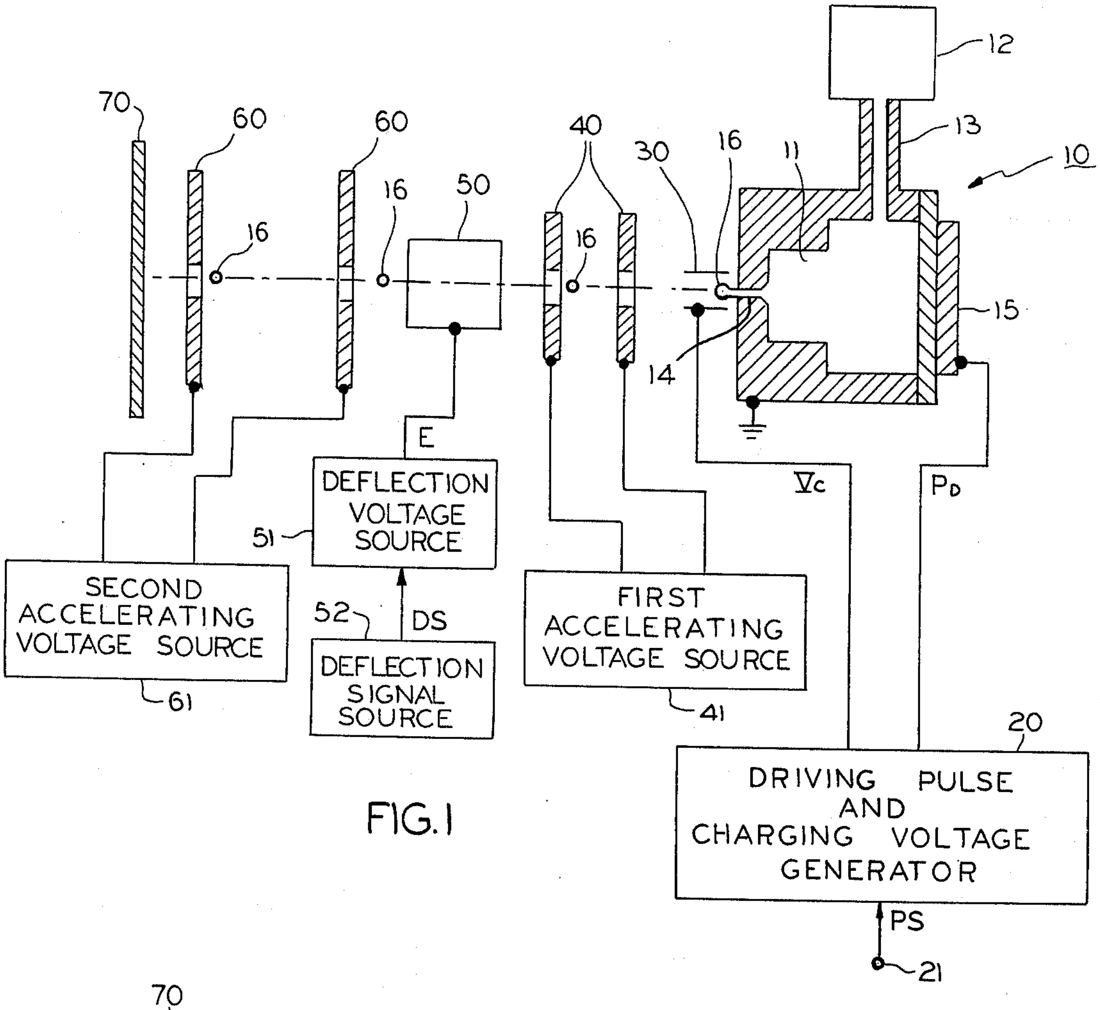
FIG. 1 is a cross-sectional view of a first embodiment of this invention.

Referring to FIG. 1, the first embodiment comprises a print head 10 having an ink chamber 11 filled with conductive ink, which is supplied from an ink reservoir 12 through a supply tube 13, a nozzle 14 positioned at one side and a piezoelectric member 15 mounted on the opposite side. The volume of the chamber 11 is reduced each time that the piezoelectric member 15 is electrically pulsed by a driving pulse $P_D$ applied from a driving pulse/charging voltage generator 20. The print head 10 operates on demand, and simply squirts out an ink droplet 16 each time a pressure pulse is applied to the conductive ink in the chamber 11 by applying the driving pulse $P_D$ from the generator 20 to the piezoelectric member 15. The droplet size is varied in response to the energy content of the driving pulse $P_D$, such as pulse width and pulse amplitude.

The first embodiment further comprises charging electrodes 30 applied with a charging voltage $V_c$ from the generator 20, first accelerating electrodes 40 applied with a first accelerating voltage from a first accelerating voltage source 41, deflection electrodes 50 applied with a deflection voltage E from a deflection voltage source 51, and second acclerating electrodes 60 applied with a second accelerating voltage from a second voltage source 61.

The ink droplet 16 having weight of m, which is squirted out of the print head 10, are charged while passing between the charging electrodes 30 by a charge value q proportional to the charging voltage $V_c$. The charged ink-droplet 16 is accelerated by the first accelerating electrodes 40 and then passed through a space between the deflection electrodes 50 to be deflected in response to the weight m, the charge value q and the deflection voltage E. The deflected ink-droplet 16 is again accelerated by the second accelerating electrodes 60 and then applied to a printing surface of a paper 70.

Figure 2:
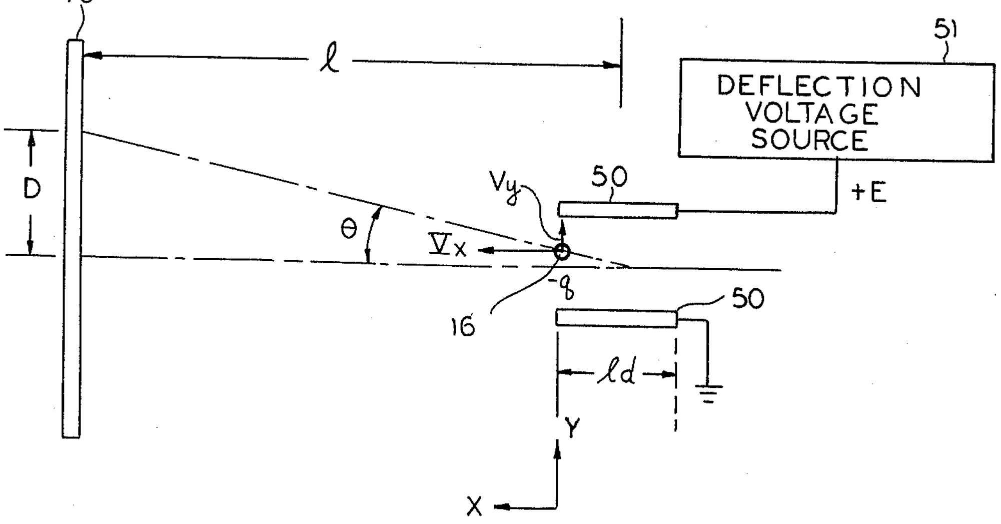
FIG. 2 illustrates the principle of this invention.

Referring to FIG. 2, the ink droplet 16 is deflected by an angle $\theta$ while passing through the deflection space between the deflection electrodes 50, whereby the droplet 16 contains a Y-direction velocity component $V_y$. The droplet 16 deflected by angle $\theta$ is then directed to the printing surface of the paper 70 to obtain a deflection D thereon. The deflection D is represented by:

$$D = l \cdot \tan\theta = l \cdot \frac{V_y}{V_x} \quad (1)$$

where symbol "l" stands for a distance between the deflection electrodes 50 and the printing surface of the paper 70, and "$V_x$" for the X-direction velocity of the deflected droplet at the exit of the deflection electrodes 50. Because it is considered that the change in X-direction velocity component $V_x$ due to the passage of the droplet 16 through the deflection space is negligible, the Y-direction component $V_y$ can be represented by:

$$V_y = \frac{qE}{m} \cdot \frac{ld}{V_x} \quad (2)$$

where symbol "ld" stands for length of the deflection space. Therefore, the deflection D can be rewritten to:

$$D = l \cdot \frac{V_y}{V_x} = \frac{qE}{m} \cdot \frac{l \cdot ld}{V_x^2} \quad (3)$$

In order to make the deflection D uniform even when the weight m of the droplet 16 is varied under the condition that the deflection voltage E is applied to the deflection electrodes 50, it must be satisfied that the ratio q/m is maintained at a fixed value under the condition that the fluctuation in the velocity $V_x$ of the droplets 16 due to the variation in the droplet size is considered to be negligible. In other words, the charge value q must be varied in proportional to the weight m of the droplet 16.

It is, therefore, apparent that the electrostatic deflection method can be applied for deflecting the droplets differring from each other in droplet size when the charge value q is varied in proportional to the weight m. Further, it is also apparent that such droplets can be uniformly accelerated under such condition. This principle is employed in this invention.

Referring again to FIG. 1, the generator 20 produces, upon receipt of an input picture signal PS supplied from an input terminal 21, the driving pulse $P_D$ and the charging voltage $V_c$ satisfying that charge value q proportional to the charging voltage $V_c$ is varied in proportional to the droplet weight m determined by the energy content of the driving pulse $P_D$.

Referring to FIG. 3, the first example 20A of the generator 20 comprises a charge voltage generator 101 for generating the charging voltage $V_c$ proportional to the level L of the picture signal PS, and a driving pulse generator 102 for generating the driving pulse $P_D$. The pulse width and/or pulse amplitude of the driving pulse $P_D$ are so controlled in response to the picture signal level L that the energy content C thereof determining the droplet weight m is proportional to the picture signal level L. Because each of the charging voltage $V_c$ and the energy content C of the driving pulse $P_D$ is proportional to the picture signal level L, the ratio of $V_c/C$ can be maintained at the fixed value. Therefore, it is also possible to fix the ratio of q/m even when the droplet size is varied in response to the picture signal level L. This means that the droplets 16 differring from each other in size can be uniformly accelerated by the accelerating electrodes 40 and 60, and uniformly deflected by the deflection electrodes 50. The deflection D is responsive to the deflection voltage E, which is controlled by a deflection information signal DS supplied from a deflection signal source 52 (FIG. 1).

Referring to FIGS. 4 through 6, the second example 20B of the generator 20 comprises a clock pulse generator 103 for generating a clock pulse CP as shown in FIG. 5A or 6A, and a charging voltage generator 104 for generating a charging voltage $V_c$ of saw-tooth wave as shown in FIG. 5B, or of step-wise wave as shown in FIG. 6B, which is applied to the charging electrodes 30. The clock pulse CP is also supplied to a pulse-amplitude modulator 105, which is supplied with the picture signal PS to produce a PAM signal as shown in FIG. 5C or 6C. The PAM signal is supplied to an amplitude-component extractor 106 for producing a control signal responsive to the amplitude component of the PAM signal. The control signal is supplied to a variable delay line 107, which is supplied with the PAM signal from the modulator 105. The variable delay line 107 delays, upon receipt of the control signal, the PAM signal by a period responsive to the amplitude component of the PAM signal and produces a delayed PAM signal as shown in FIG. 5D or 6D.

The delayed PAM signal is applied as the driving pulse $P_D$ to the piezoelectric member 15 (FIG. 1), whereby the droplets 16 proportional to the amplitude component in size are squirted out of the nozzle 14 at each trailing time of the delayed PAM signal. As clearly understood from FIGS. 5B and 5D, or 6B and 6D, the level of the charging voltage $V_c$ at the trailing time of the delayed PAM signal depends on the delay time, i.e., the amplitude component. This means that the charge value q of the droplet is varied in response to the amplitude component, i.e., the droplet weight m.

In case where the droplet weight m (droplet size) is not linearly responsive to the pulse-amplitude of the driving pulse $P_D$, modification must be applied to at least one of the waveform of the charging voltage $V_c$ and the input vs. output characteristic of the amplitude-component extractor 106 so as to meet with the droplet-weight vs. pulse-amplitude characteristic.

Referring to FIGS. 7 and 8, the third example 20C of the generator 20 comprises a clock pulse generator 108 and a charging voltage generator 109, which generate a clock pulse CP and a charging voltage $V_c$ as shown in FIGS. 8A and 8B, and are identical to the generators 103 and 104, respectively. The clock pulse CP is also supplied to a pulse-width modulator 110, which is supplied with the picture signal PS to produce a PWM signal as shown in FIG. 8C. The pulse width of the PWM signal is responsive to the picture signal level L. As understood from FIGS. 8B and 8C, the charging voltage $V_c$ shown in FIG. 8B at a time corresponding to the trailing time of the PWM signal is varied in response to the pulse width.

The PWM signal is applied as the driving pulse $P_D$ to the piezoelectric member 15 to squirt out the droplet at each of the trailing times of the PWM signal. At each time that the droplet is squirted, the charging voltage proportional to the pulse width of the PWM signal is applied to the squirted droplet, whereby the charge q is varied in response to the pulse width, i.e., the droplet weight m.

In case where the droplet weight m vs. pulse width w characteristic is not linear as shown by a curve 111 in FIG. 9A, a signal having waveform similar to the curve 111 is to be used as the charging voltage $V_c$ as shown in FIG. 9B.

Figure 10:
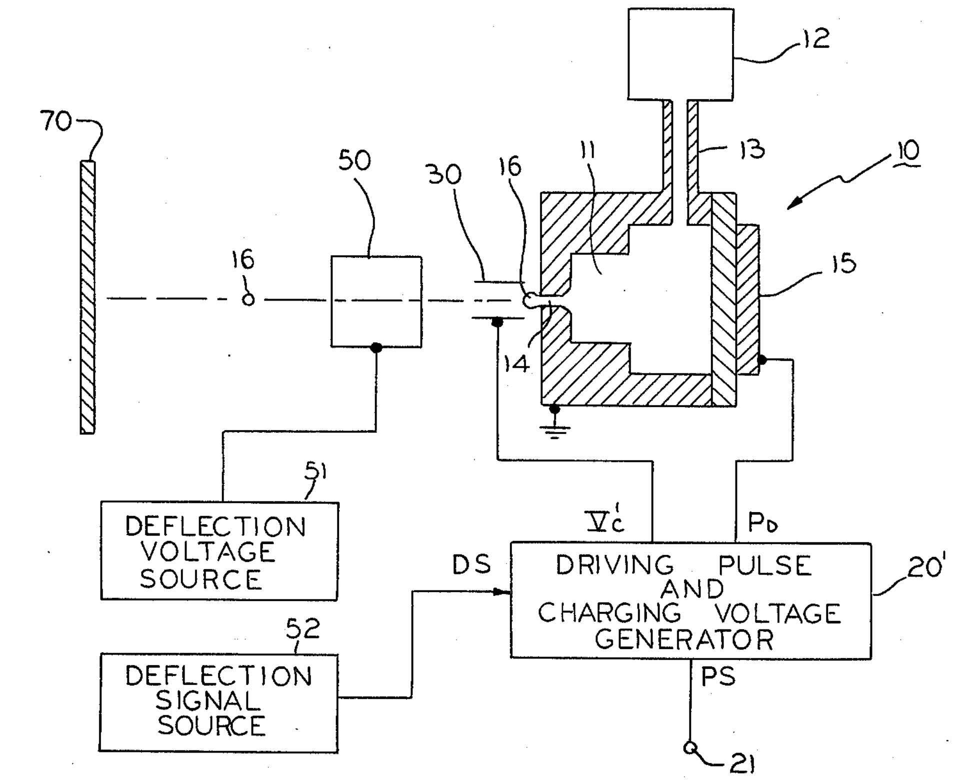
FIG. 10 is a cross sectional view of a second embodiment of this invention.

Referring to FIG. 10, the second embodiment comprises the print head 10, the driving pulse/charging voltage generator 20', the charging electrodes 30, and the deflection electrodes 50. The head 10, the electrodes 30 and 50 are identical to those in the first embodiment shown in FIG. 1. Modifications are in that the deflection information signal DS is not supplied to the deflection voltage source 51 but to the generator 20' and the accelerating electrodes 40 and 60 are omitted.

The generator 20' generates the charging voltage $V_c'$ and the driving pulse $P_D$ satisfying that the charging voltage $V_c'$ is varied in proportional to both the energy content C and the deflection information signal DS. This means that the ratio q/m for the droplet 16, which is squirted out of the nozzle 14 in response to the driving pulse $P_D$ and then charged in response to the charging voltage $V_c'$, is proportional to the deflection information signal DS. The droplets 16 thus charged is passed through the deflection space between the deflection electrodes 50, which are supplied with fixed deflection voltage from the source 51, whereby the droplet 16 can be deflected in proportional to the deflection information signal DS.

Figure 11:
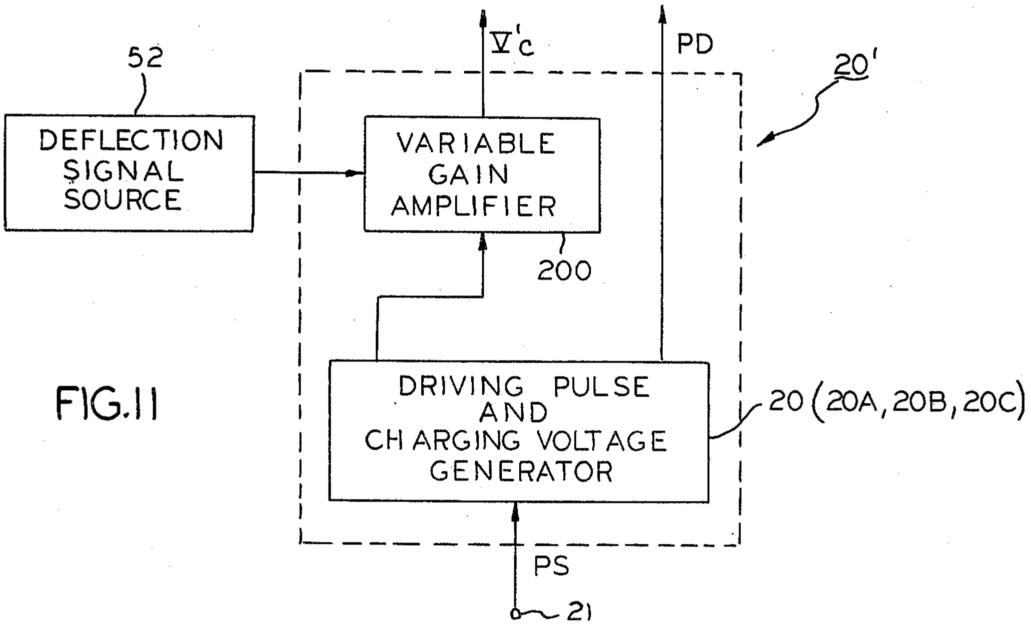
FIG. 11 is a olock diagram of a first example of the generator 20′ used in the second embodiment shown in FIG. 10.

The generators 20' comprises, as shown in FIG. 11, the generator 20 identical to that 20A, 20B or 20C in the first embodiment, and a variable-gain amplifier 200, which is supplied with the voltage $V_c$ and the deflection information signal DS from the generator 20 and the source 52, respectively. The voltage $V_c$ is controlled by the signal DS to produce the modified charging voltage $V_c'$, which is proportional not only to the energy content C of the driving pulse $P_D$ and the deflection information signal DS.

Referring to FIGS. 12 and 13, the second example of the generator 20' comprises a generator 20B' identical to the generator 20B shown in FIG. 4. The generator 20B' comprises the clock pulse generator 103' for generating the clock pulse CP as shown in FIG. 13A, the charging voltage generator 104' for generating charging voltage $V_c$ as shown in FIG. 13C, the PAM modulator 105' for producing the PAM signal as shown in FIG. 13D, the amplitude component extractor 106' and the variable delay line 107'. The structural elements 103' to 107' are identical to those 103 to 107 in FIG. 4, respectively.

The second example of the generator 20' further comprises an arithmetic circuit 201, which is supplied with the amplitude-component signal and the deflection information signal DS (FIG. 13B) from the extractor 106' and the deflection signal source 52, respectively. The arithmetic circuit 201 produces a delay-control signal representing the product of the amplitude-component signal and the deflection information signal DS.

The delay-control signal is applied to the variable delay line 107' to control the delay time. In first case where the deflection information signal DS is zero as shown by R1 in FIG. 13B, the delay time is zero as shown by $T_1$ in FIG. 13E, i.e., the PAM signal is passed through the variable delay line 107' without delaying whereby the non-delayed PAM signal D1 (FIG. 13E) is produced and supplied as the driving pulse $P_D'$ to the piezoelectric member 15. As understood from FIGS. 13C and 13E, at the time when the non-delayed PAM signal D1 is applied to the piezoelectric member 15, i.e., at the trailing time of the signal D1, the charging voltage $V_c$ is zero, whereby the squirted droplet 16 is not charged and then passed through the deflection space without affecting the deflection.

In second and third cases where the deflection information signal DS is not zero as shown by R2 and R3 in FIG. 13B, the delay time is varied in response to the amplitude-component signal within time period ranges $T_2$ and $T_3$, respectively, as shown in FIG. 13E, whereby the delayed PAM signals D2 and D3 are produced and supplied as the driving pulse $P_D'$ to the piezoelectric member 15. As understood from FIGS. 13C and 13E, at the trailing times of the delayed PAM signals D2 and D3, the droplets are squirted out and charged by the charging voltage $V_c$, which is responsive to the energy content, i.e., pulse amplitude of the driving pulse and the deflection information.

In the second embodiment, the deflection voltage to be applied to the deflection electrodes 50 is fixed. This makes it possible to use the common deflection electrodes even when applied to multi-nozzle print head.

In the first and second embodiments described above, the charging voltage $V_c$ is varied in response to the energy content of the driving pulse $P_D$ (in the first embodiment) or both of the energy content and the deflection information signal DS (in the second embodiment). In other words, the charge value q is varied in response to the droplet size (droplet weight m) or both of the droplet size and the deflection information under the condition that the fluctuation in velocity $V_x$ of the droplet 16 due to the variation in the droplet size is considered to be negligible.

In case, however, where it is not negligible, the charge value q, i.e., the charging voltage $V_c$ must be responsive further to the square of velocity, i.e., $V_x^2$. The velocity $V_x$ is varied as a function of the droplet size, i.e., the amplitude and pulse width of the driving pulse $P_D$ applied to the piezoelectric member 15. Therefore, the velocity $V_x$ is previously obtained in accordance with the amplitude and the pulse width, and the square of the velocity, i.e., $V_x^2$ is stored in the digital memory (ROM) in which addresses correspond to the combination of the amplitude and pulse width of the driving pulse $P_D$. The stored value is read out in response to the driving pulse and then supplied to the charging voltage generator 101 (or 104, or 109 or 104') or to the variable gain amplifier 200 to control the charging voltage $V_c$ (or $V_c'$).

The charging voltage generators 101, 104, 104', and 109 may be composed of the digital memory (ROM) in which the various kinds of the voltage levels are stored in addresses designated by the amplitude and pulse width of the driving pulse $P_D$, and the voltage levels are previously obtained in response to the product of the droplet size and the square of the velocity ($V_x^2$).

What is claimed is:

1. An ink-jet printer for recording with droplets of condutive ink on a recording medium, comprising:

an ink chamber filled with said conductive ink, said chamber having a nozzle and a piezoelectric member attached to one wall of said chamber, said chamber squirting said droplets out of said nozzle in response to a driving pulse applied to said piezoelectric member, the size of said droplets being responsive to the energy content of said driving pulse;

means for charging said droplets squirted out of said nozzle in response to a charging voltage; and means for generating said driving pulse and said charging voltage, said charging voltage being responsive to said energy content of said driving pulse.

* * * * *